United States Patent
Xiao

[11] Patent Number: 6,102,840
[45] Date of Patent: Aug. 15, 2000

[54] TOOL CHANGER FOR MACHINE TOOL

[76] Inventor: Alan Xiao, No. 436, Sec. 1, Chong San Road, Tarn Tzu Hsiang, Taichung Hsien, Taiwan

[21] Appl. No.: 09/221,396

[22] Filed: Dec. 28, 1998

[51] Int. Cl.$^7$ .................................................. B23Q 3/157
[52] U.S. Cl. .............................................. 483/67; 483/59
[58] Field of Search ................................. 483/67, 66, 56, 483/58, 59, 902; 211/1.5; 29/26 A

[56] References Cited

U.S. PATENT DOCUMENTS

| | | | |
|---|---|---|---|
| 3,780,406 | 12/1973 | Cupler, II et al. | 29/26 A |
| 4,122,598 | 10/1978 | Pegler et al. | 29/568 |
| 4,399,604 | 8/1983 | Krug | 483/67 |
| 5,702,336 | 12/1997 | Kameyama | 483/56 |
| 5,762,594 | 6/1998 | Hoppe | 483/56 |
| 5,899,839 | 5/1999 | Xiao | 483/67 |
| 5,899,840 | 5/1999 | Xiao | 483/67 |

FOREIGN PATENT DOCUMENTS

| | | | |
|---|---|---|---|
| 3234675 | 3/1984 | Germany | 483/67 |
| 289633 | 11/1989 | Japan | 483/67 |
| 9005616 | 5/1990 | WIPO | 483/67 |

*Primary Examiner*—William Briggs
*Attorney, Agent, or Firm*—Charles E. Baxley

[57] ABSTRACT

A tool changer for a machine tool includes a disc magazine having a number of openings opened radially outward from the peripheral portion for receiving tool members. Two or more retainers are rotatably secured to the disc magazine and extended inward of each of the openings of the disc magazine for engaging with the tool members and for retaining the tool members in place. A number of springs are further secured to the disc magazine and engaged with the tool members for clamping the tool members in place.

7 Claims, 6 Drawing Sheets

TOOL CHANGER FOR MACHINE TOOL

BACKGROUND OF THE INVENTION

1. Field of the Invention

The present invention relates to a tool changer, and more particularly to a tool changer for a machine tool.

2. Description of the Prior Art

Typical machine tools, particularly the programmable machine tools comprise one or more disc magazines rotatably secured therein and having a number of notches formed in the peripheral portions for supporting a number of tool members. The peripheral portions of the disc magazines comprise a number of ribs or flanges extended inward of the notches for engaging with the annular grooves of the tool members and for securing the tool members in place. One of such a typical tool changers is disclosed in U.S. Pat. No. 5,762,594 to Hoppe. However, the tool members may not be stably retained in place. U.S. Pat. No. 4,122,598 to Pegler et al. discloses another type of the tool changers and comprise a number pairs of fingers for supporting the tool members. However, the fingers have a bad strength and may not stably support the tool members in place.

In addition, the sizes of the openings and of the fingers of the disc magazines are predetermined and may not be adjusted for receiving the tool members of different sizes or shapes.

The present invention has arisen to mitigate and/or obviate the afore-described disadvantages of the conventional tool changers for machine tools.

SUMMARY OF THE INVENTION

The primary objective of the present invention is to provide a tool changer having a structure for stably retaining the tool members in place.

The other objective of the present invention is to provide a tool changer having an adjustable structure for being easily changed to retain the tool members of different sizes or shapes in place.

In accordance with one aspect of the invention, there is provided a tool changer for a machine tool, the tool changer comprising a disc magazine including a peripheral portion having a number of openings opened radially outward for receiving tool members, at least two retainers secured to the disc magazine and extended inward of each of the openings of the disc magazine for engaging with the tool members and for retaining the tool members in place, and means for securing the retainers to the disc magazine.

The retainers each includes a peripheral flange extended inward of the openings of the disc magazine for engaging with the tool members. The disc magazine includes at least two notches formed therein and communicating with each of the openings for receiving the retainers respectively. The securing means is preferably a bolt.

The retainers each includes an extension engaged with the disc magazine for securing the retainers to the disc magazine. The extensions each includes at least one slit formed therein for defining at least two legs. The extensions each includes an annular projection extended radially outward therefrom for engaging with the disc magazine and for securing the retainers to the disc magazine.

A spring means is further provided for clamping the tool members in place and includes a number of springs secured to the disc magazine and each having a pair of arms engaged with the tool members for clamping the tool members in place.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
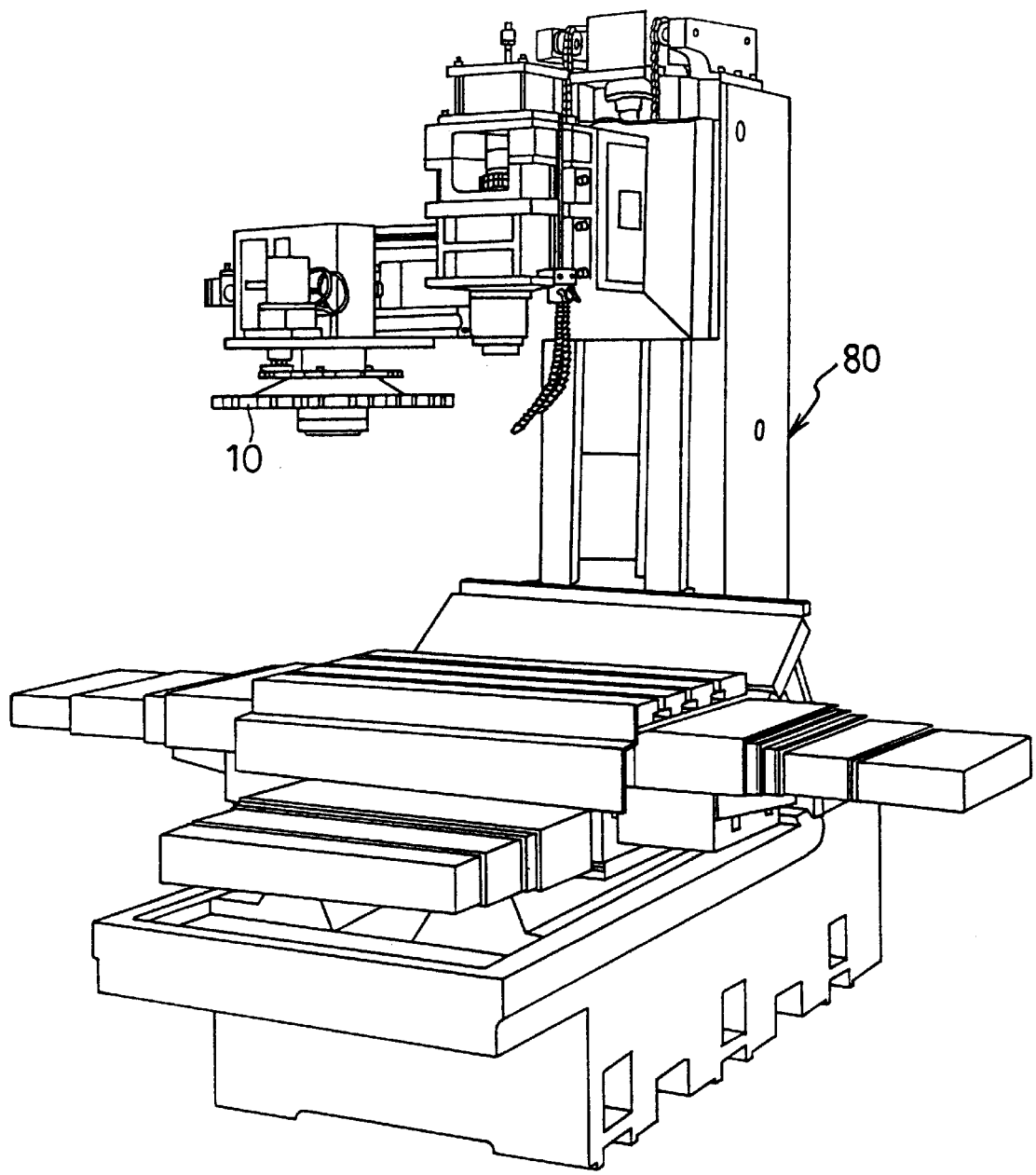
FIG. 1 is a perspective view of a machine tool having a tool changer in accordance with the present invention.
Figure 3:
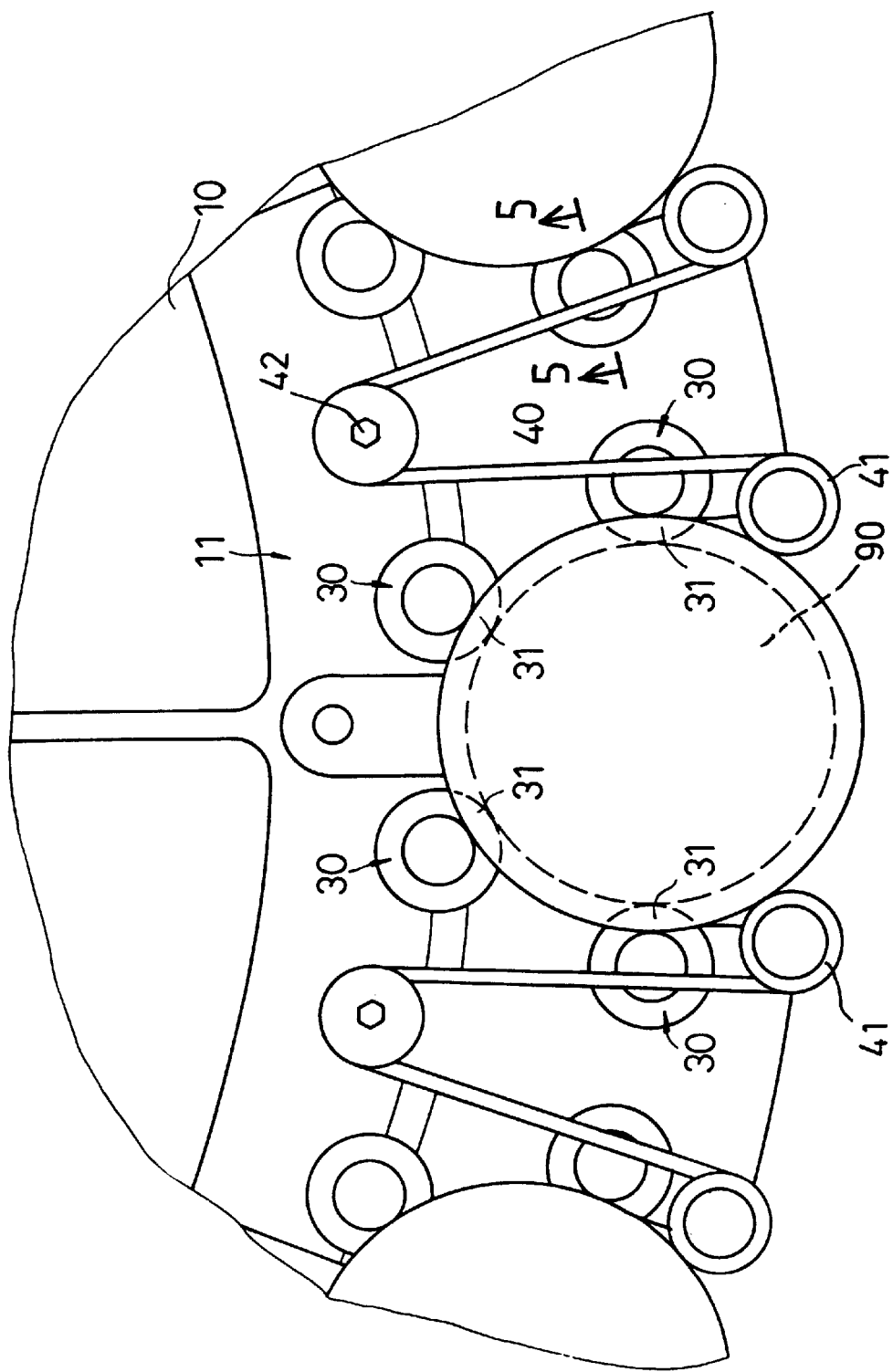
FIG. 3 is a partial plan view of the disc magazine.

Referring to the drawings, and initially to FIG. 1, illustrated is a machine tool 80 employing a tool changer in accordance with the present invention which includes a disc magazine 10 rotatably attached to the machine tool 80. The disc magazine 10 of the tool changer includes a peripheral portion 11 having a number of openings 20 opened radially outward for receiving tool members 90 respectively. The tool members 90, particularly the cutting tools, each includes an annular groove 92 formed in the shank portion 91 thereof. The disc magazine 10 includes two or more notches 21 formed around each of the openings 20 and communicating with the openings 20 for rotatably receiving a retainer 30 therein. The retainers 30 each includes a peripheral flange 31 (FIGS. 5–8) partially extended inward of the opening 20 of the disc magazine 10 for engaging into the annular grooves 92 of the tool members 90 and for retaining the tool members 90 in place (FIG. 3). It is to be noted that a pair of opposite retainers 30 are good enough to retain the tool member 90 in place.

Figure 2:
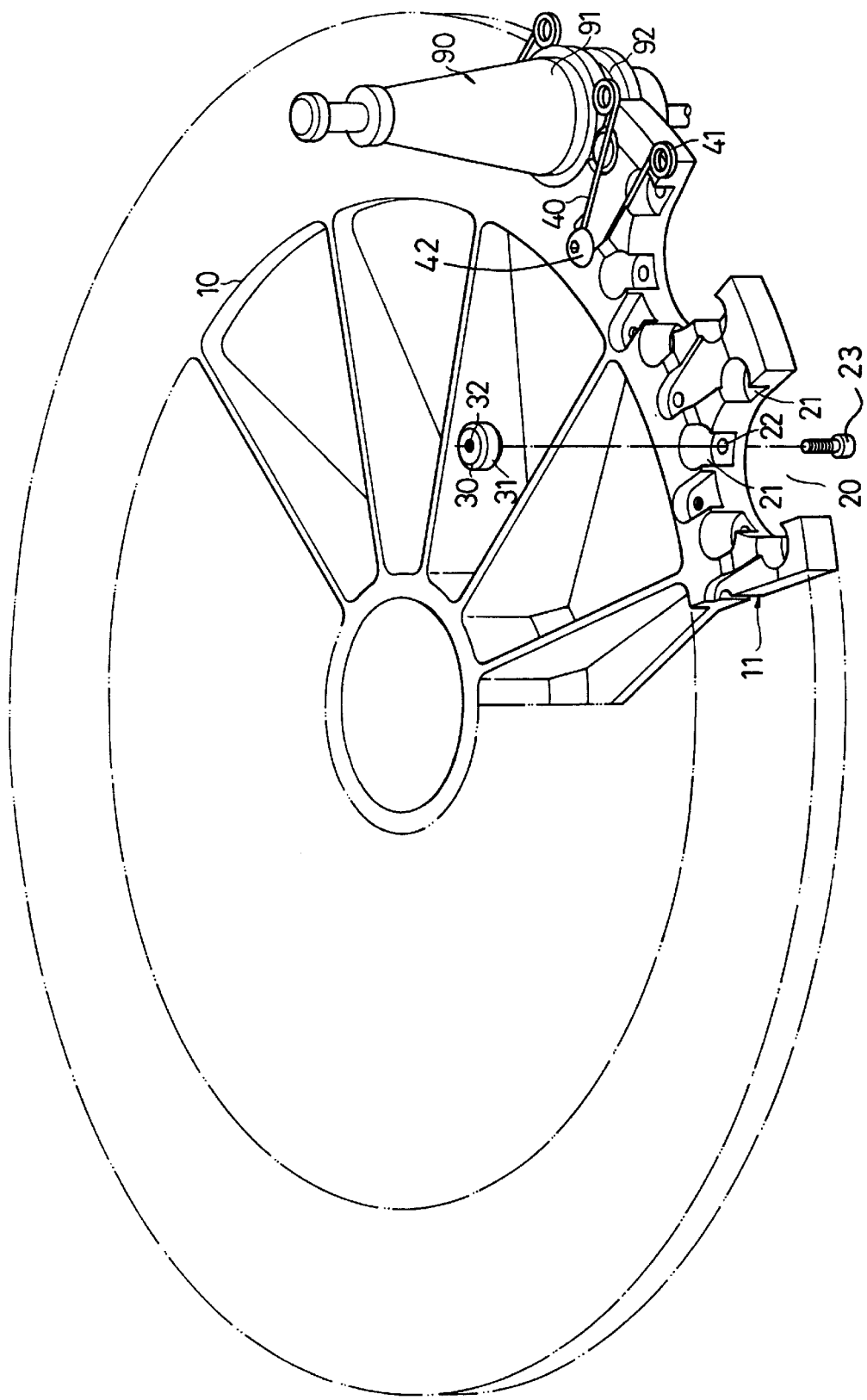
FIG. 2 is a partial exploded view of the disc magazine.
Figure 4:
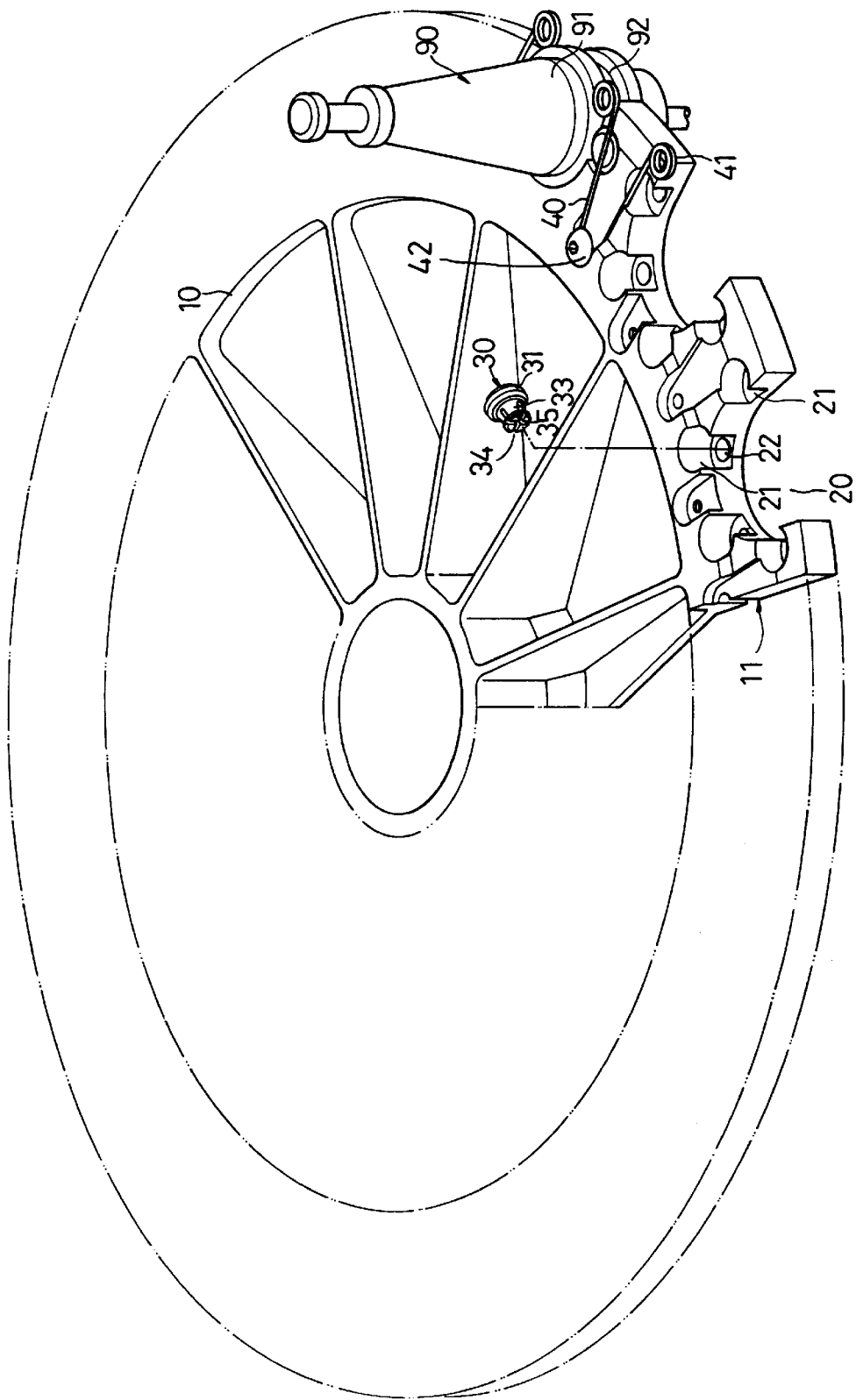
FIG. 4 is a partial exploded view similar to FIG. 2, illustrating another application of the disc magazine.
Figure 6:
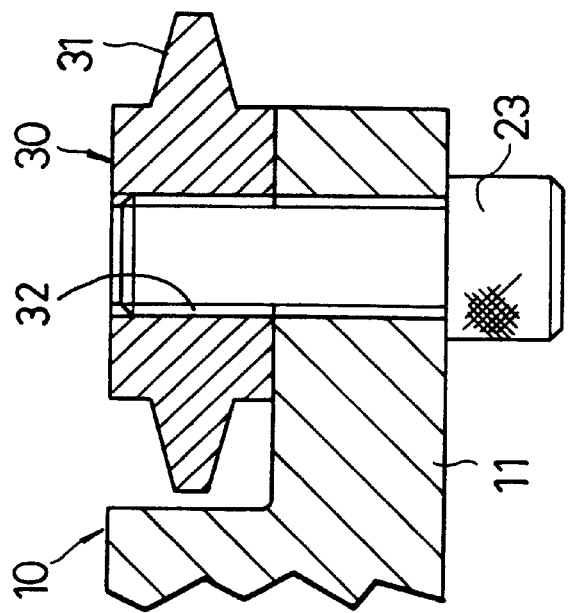
FIGS. 6, 7, 8 are cross sectional views similar to FIG. 5, illustrating the other applications of the disc magazine.
Figure 5:
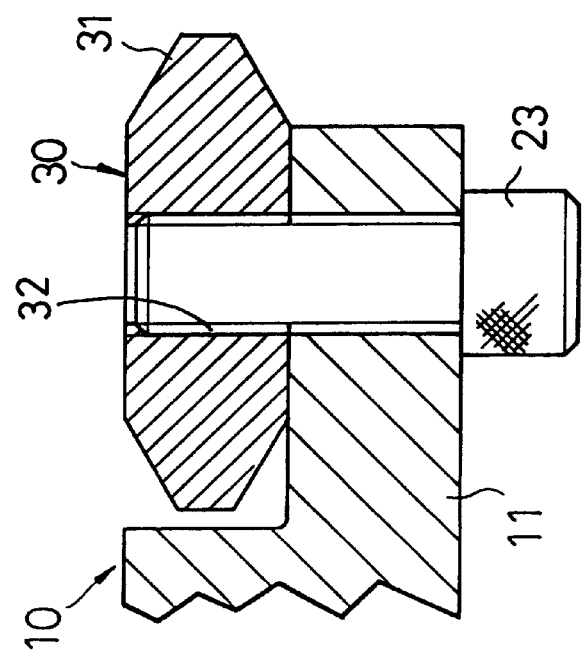
FIG. 5 is a cross sectional view taken along lines 5—5 of FIG. 3.
Figure 7:
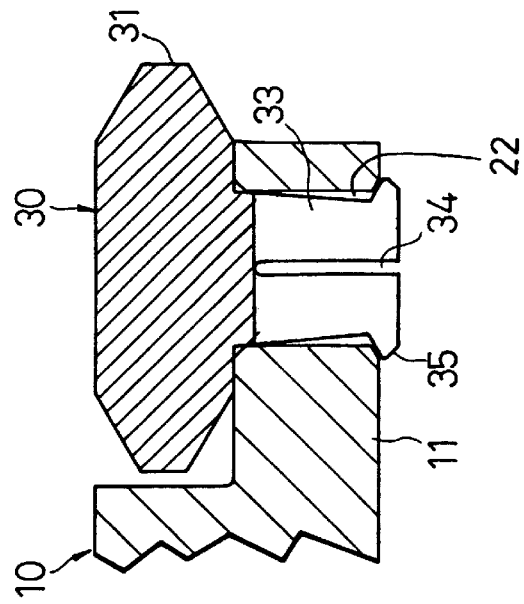
Figure 8:
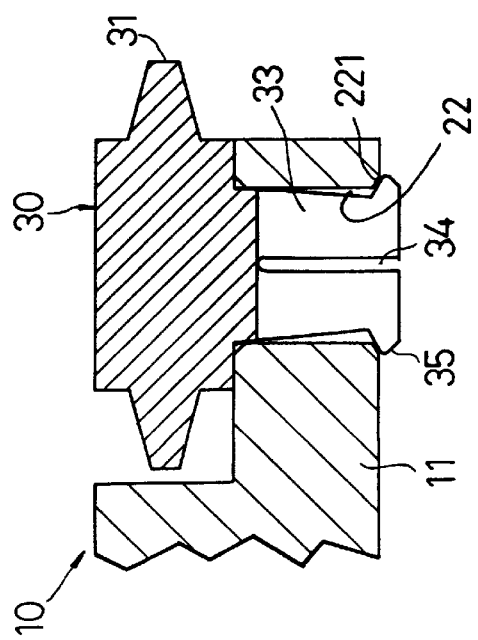

Referring next to FIGS. 5 and 6, and again to FIG. 2, the retainers 30 may be secured to the disc magazine 10 by bolt fasteners 23 which are engaged through the holes 22 of the disc magazine 10 and which are threaded with the inner thread 32 of the retainers 30 such that the retainers 30 may be easily engaged with and disengaged from the disc magazine 10. As shown in FIGS. 4, 7 and 8, the retainers 30 may each include an extension having one or more slits 34 formed therein for defining two or more resilient legs 33. The legs 33 each has a projection 35, or the extension includes an annular projection 35 (FIG. 4) extended radially outward therefrom for engaging with the inclined or rounded surface 221 of the disc magazine 10 and for rotatably securing the retainers 30 to the disc magazine 10. The retainers 30 may include flanges 31 of different shapes or sizes for engaging with the grooves 92 of the tool members 90 of the corresponding shapes or sizes, such that various kinds of tool members may be easily changed and supported by the disc magazine 10 by simply changing the retainers 30.

Referring again to FIGS. 2–4, the disc magazine 10 further includes a number of springs 40 disposed between the openings 20 and each has a middle portion secured to the disc magazine 10 by a fastener 42 and each includes a pair of arms 41 for further resiliently securing and retaining the tool members 90 in place. It is to be noted that, without the retainers 30, the tool members 90 may be stably retained in place within the openings 20, and the springs 40 may resilient force the tool members 90 to the disc magazine 10 for stably retaining the tool members 90 in place.

Accordingly, the tool changer in accordance with the present invention includes an adjustable structure for stably retaining the tool members in place and for being easily changed to retain the tool members of different sizes or shapes in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool changer for a machine tool, said tool changer comprising:

a disc magazine including a peripheral, portion having a plurality of openings opened radially outward for receiving tool members, at least two retainers secured to said disc magazine and extended inward of each of said openings of said disc magazine for engaging with the tool members and for retaining the tool members in place, and means for securing said at least two retainers to said disc magazine, said securing means including an extension extended from each of said at least two retainers and engaged with said disc magazine for securing said at least two retainers to said disc magazine, said extensions each including at least one slit formed therein for defining at least two legs.

2. The tool changer according to claim 1, wherein said at least two retainers each includes a peripheral flange extended inward of said openings of said disc magazine for engaging with the tool members.

3. The tool changer according to claim 1, wherein said disc magazine includes at least two notches formed therein and communicating with each of said openings for receiving said at least two retainers respectively.

4. The tool changer according to claim 1, wherein said securing means is a bolt.

5. The tool changer according to claim 1, wherein said extensions each includes an annular projection extended radially outward therefrom for engaging with said disc magazine and for securing said at least two retainers to said disc magazine.

6. The tool changer according to claim 1 further comprising spring means for clamping the tool members in place.

7. The tool changer according to claim 6, wherein said spring means includes a plurality of springs secured to said disc magazine and each having a pair of arms engaged with the tool members for clamping the tool members in place.

* * * * *